United States Patent [19]

Walter et al.

[11] Patent Number: 4,586,833
[45] Date of Patent: May 6, 1986

[54] PRONG-TYPE CAGE FOR ROLLING BEARINGS

[75] Inventors: Lothar Walter, Schweinfurt; Walter Reith, Bad Bocklet, both of Fed. Rep. of Germany

[73] Assignee: SKF Kugellagerfabriken GmbH, Schweinfurt, Fed. Rep. of Germany

[21] Appl. No.: 584,089

[22] Filed: Feb. 27, 1984

[30] Foreign Application Priority Data

Mar. 25, 1983 [DE] Fed. Rep. of Germany ....... 3310938

[51] Int. Cl.⁴ .................... F16C 19/20; F16C 33/38
[52] U.S. Cl. .................................... 384;531; 384/534
[58] Field of Search ................... 308/201, 188, 189 R, 308/189 A, 190, 193

[56] References Cited

U.S. PATENT DOCUMENTS

| 985,289 | 2/1911 | Schneider | 308/201 |
| 1,269,087 | 6/1918 | Keiper | 384/614 |
| 1,814,993 | 7/1931 | Wickland | 308/201 |

FOREIGN PATENT DOCUMENTS

| 993520 | 11/1951 | France |  |
| 48379 | 7/1918 | Sweden | 308/201 |

Primary Examiner—Stuart S. Levy
Assistant Examiner—Lynn M. Sohacki
Attorney, Agent, or Firm—Yuter, Rosen & Dainow

[57] ABSTRACT

A prong-type cage for rolling bearings formed by a ring and circumferentially spaced prongs or posts extending axially from the ring, defining pockets for separating the rolling elements, is designed to avoid being damaged when the mold parts are removed by recesses axially extending from the outer face of the ring axially into the posts.

3 Claims, 3 Drawing Figures

PRONG-TYPE CAGE FOR ROLLING BEARINGS

BACKGROUND OF THE INVENTION

This invention is in the field of rolling bearings and particularly a prong-type cage for radial ball bearings which is provided at the free ends of axial prongs with projections for axial fixation of the rolling members in the cage pockets.

The prior art French Pat. No. 993,520 discloses snap cages for ball bearings having a continuous solid-wall slide ring and cage tabs, slotted or provided with recesses and proceeding from said side ring toward one side, which are elastically yielding, so that the tool parts, on molding during manufacture of the cage, may easily be withdrawn from the cage pockets. These known designs, however, have the disadvantage that where brittle materials are used, e.g., glass fiber material, pieces of the cage break off upon removal of the cage from the casting or injection mold, and the part becomes unusable.

The object of the present invention is to provide a prong-type cage of the type mentioned which is not damaged upon opening of the mold tool parts.

SUMMARY OF THE INVENTION

The above-noted object is accomplished pursuant to the invention by providing an axially extending recess in the region of each cage pocket proceeding from the outer face of the side ring of the cage and extending over at least part of the length of the posts and prongs in the walls of the posts. The width of each recess measured in the circumferential direction is greater than the diameter of the rolling members, and the depth of each recess, measured in the radial direction is less than the thickness of the side ring of the cage. This cage pursuant to the invention has large spaces for accommodating lubricant and possesses uniform cross section, so that no distortion of the cage parts occurs after casting or injection.

According to additional features of the invention the clearance between the semicurcular projections of a cage pocket on both sides of the recess and the distance separating the circumferentially directed surfaces at the ends of the prongs is smaller than the diameter of the rolling members, so that the latter are securely held and guided in the cage pockets.

In addition, it is advantageous in a ball bearing cage for the wall of the cage pockets to be semicircular in shape and to be provided with an inside diameter which is smaller than the outside diameter of the balls.

A preferred embodiment of a prong-type cage pursuant to the invention is represented in the drawings described below.

DETAILED DESCRIPTION OF THE PREFERRED EMBODIMENT

Figure 1:
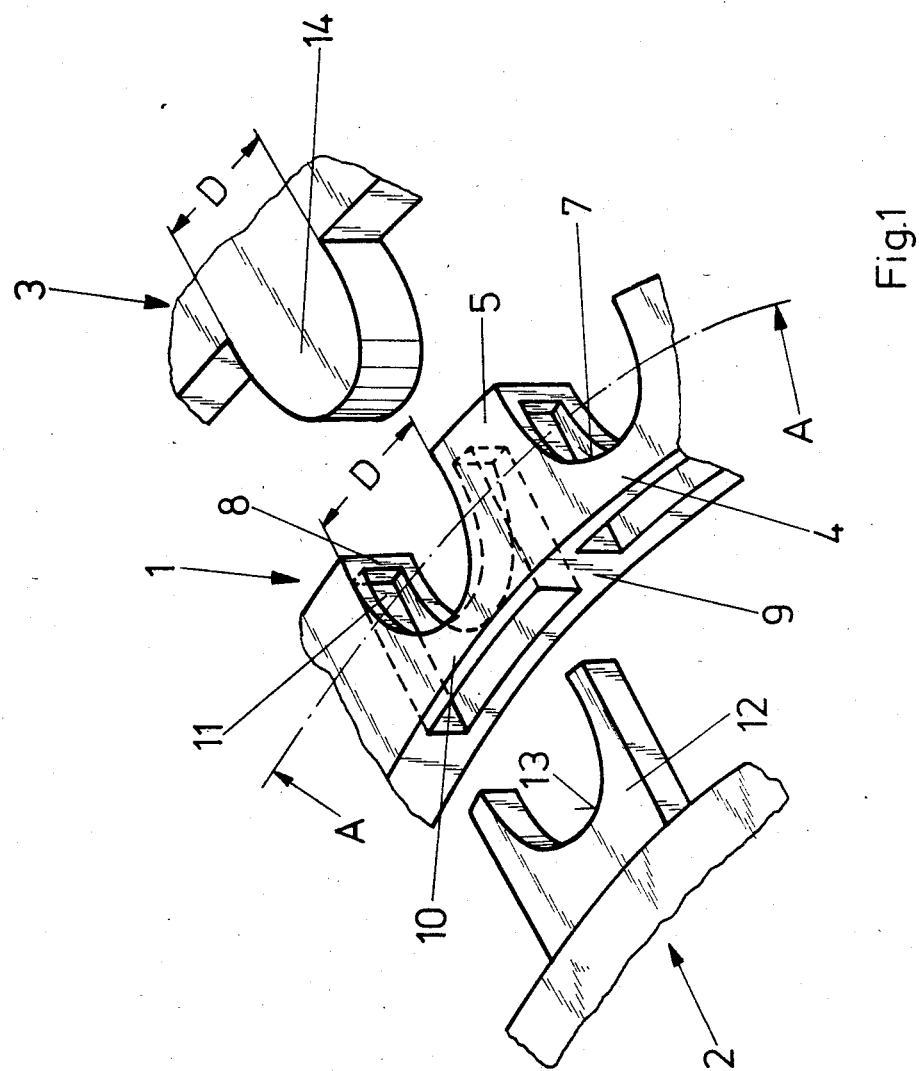
FIG. 1 is a perspective view of a portion of the cage pursuant to the invention for a radial ball bearing with the tool parts shown axially displaced.
Figure 2:
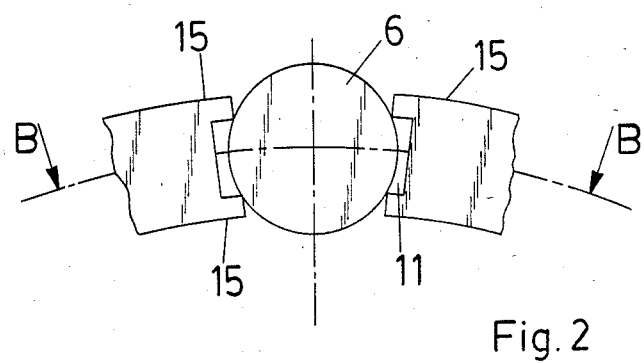
FIG. 2 is a radial section taken along line A—A through a cage pocket of FIG. 1.
Figure 3:
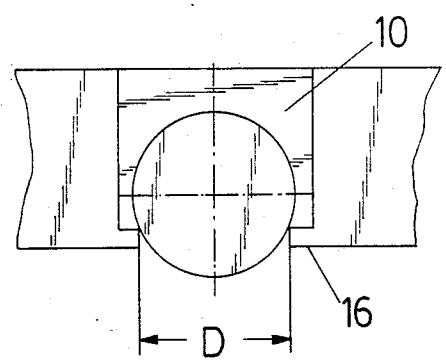
FIG. 3 is an axial section taken along line B—B through a cage pocket of FIG. 2.

In FIGS. 1 to 3 is represented a snap cage 1 for a ball bearing which is made by casting or injection molding in a two-part tool shown as fragmentary parts 2 and 3. The cage 1 pursuant to the invention consists of a side ring 4 and the prongs 5 extending axially from ring 4 which hold the balls 6 apart. The prongs define between them pockets 7 having a pair of semicircular walls in the region of the side ring 4, these walls having an inside diameter which is smaller than the outside diameter of the balls 6. In the region of the pocket opening the walls of the cage pockets 7 are provided with surfaces 8, whose distance apart D is smaller than the diameter of the balls 6. In the region of each cage pocket 7 there is provided an axially extending recess 10 proceeding from the outer surface 9 of the side ring 4 of the cage and continuing axially in the semicircular walls of the prongs 5 over a part of the axial extent of the prongs. The width of each recess, measured in the circumferential direction is greater than the diameter of the rolling members, and the height of each recess measured in the radial direction, is less than the height of the side ring 4 of the cage. The axial extent of the recess being less than that of the cage in the prong region results in the formation of end surfaces 11 on opposite circumferential sides of the pocket defining the axially furthermost extent of the recess 10 adjacent surfaces 8 of pocket 7. This pocket shape is produced by the axially retractable tool parts 2 and 3, which may be freely retracted after casting or injection. The tool part 2 has flat shoulders 12 with rectangular cross section and a recess 13 in which the projection 14 of the tool part 3 engages in working position. The radial extension of the shoulders 12 is less than that of the projection 14, and the tool part 2 is arranged such that projections 15 are formed on the cage 1 above and below the pitch circle. The shoulders 12 of the tool part 2 produce recesses 10 in the cage 1, which recesses serve as reservoirs for lubricant. The balls 6 are snapped into the cage pockets 7 and guided to the projections 15, which hold the ball radially secured. The projections 16 at the ends of the prongs 5 secure the balls 6 in the axial direction.

The embodiment described represents only one example of the cage pursuant to the invention. Variations in design are possible within the scope of the invention. Thus the cage pockets may alternatively be designed to suit other shapes of rolling members, and the cages may alternatively be used for cylindrical rolling bearings.

We claim:

1. In a cast or molded prong-type cage for holding rolling elements which are distributed about the circumference of a rolling bearing, the cage having a bore defining an axis, comprising a side ring with a plurality of circumferentially distributed prongs extending axially therefrom, each two adjacent prongs defining therebetween a pocket for receiving one of said rolling elements, each of said prongs having projections at the ends thereof for axially securing said rolling elements in said cage, the improvement in combination therewith wherein said cage is further provided with a plurality of circumferentially separated axially extending recesses, each of said recesses extending axially through said side ring and communicating with one of said pockets, the axial depth of each of said recesses being less than the axial dimension of said cage in the area of said prongs, each of said recesses having a width in the circumferential direction greater than the diameter of said rolling elements and having a radial dimension less than that of said ring.

2. A cage as defined in claim 1, wherein the distance between the projection extending from the prong on one side of a pocket and the projection extending from the adjacent prong on the opposing side of said pocket is less than the diameter of said rolling element to be seated in said pocket.

3. A cage as defined in claim 1, wherein each said prong comprises a pair of walls arranged on either side of each recess, said walls each having a semicircular boundary for defining the respective pocket, the diameter of said semicircular boundary being less than the diameter of said rolling element to be seated in said pocket.

* * * * *